United States Patent
Müller

(10) Patent No.: US 12,370,846 B2
(45) Date of Patent: Jul. 29, 2025

(54) METHOD FOR MOVING A VEHICLE TO A COMPONENT OF AN OBJECT AT A DISTANCE THEREFROM (COORDINATE TRANSFORMATION)

(71) Applicant: JOST-WERKE DEUTSCHLAND GMBH, Neu-Isenburg (DE)

(72) Inventor: Mark Müller, Frankfurt (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 663 days.

(21) Appl. No.: 17/833,162

(22) Filed: Jun. 6, 2022

(65) Prior Publication Data
US 2022/0396108 A1 Dec. 15, 2022

(30) Foreign Application Priority Data
Jun. 10, 2021 (DE) .................. 10 2021 002 956.9

(51) Int. Cl.
*B60D 1/36* (2006.01)
*B60R 1/00* (2022.01)
(Continued)

(52) U.S. Cl.
CPC ............. *B60D 1/36* (2013.01); *B60R 1/003* (2013.01); *B60R 1/26* (2022.01); *B60R 11/04* (2013.01);
(Continued)

(58) Field of Classification Search
CPC .. B60D 1/36; B60R 1/26; B60R 1/003; B60R 11/04; B60R 2300/808; B60W 30/18036; B60W 2300/145; B60W 2420/403
See application file for complete search history.

(56) References Cited

U.S. PATENT DOCUMENTS

| 2016/0375831 A1* | 12/2016 | Wang | G06F 3/048 |
| | | | 348/148 |
| 2020/0148258 A1* | 5/2020 | Mayer | B60D 1/62 |
| 2021/0213791 A1* | 7/2021 | Ionascu | G01S 15/86 |

FOREIGN PATENT DOCUMENTS

| DE | 102004029130 A1 | 12/2005 |
| DE | 102012003992 A1 | 8/2013 |

(Continued)

*Primary Examiner* — Jacob M Amick
(74) *Attorney, Agent, or Firm* — Hudak, Shunk & Farine Co., LPA

(57) ABSTRACT

A method for moving a vehicle to a component of an object at a distance therefrom, the vehicle having a navigation module which has a camera and an evaluation electronics, and an identification element is attached to the object in a predetermined position in such a way that it is recognized by the camera in a far range ($D_{max}$) of the vehicle from the object, and a reverse driving line of the vehicle is calculated by the evaluation electronics from the perspective position of the camera in relation to the identification element. The method improves the approach of a vehicle to a stationary object. In a start position (S) of the vehicle, the navigation module generates a static object coordinate system ($K_O$) and a reverse driving line is calculated from the start position (S) to a pre-positioning point ($S_{Vi}$, $S_{Vii}$, $S_{Viii}$).

20 Claims, 6 Drawing Sheets

(51) Int. Cl.
*B60R 1/26* (2022.01)
*B60R 11/04* (2006.01)
*B60W 30/18* (2012.01)

(52) U.S. Cl.
CPC . *B60W 30/18036* (2013.01); *B60R 2300/808* (2013.01); *B60W 2300/145* (2013.01); *B60W 2420/403* (2013.01)

(56) References Cited

FOREIGN PATENT DOCUMENTS

| DE | 102014217746 A1 | 3/2015 |
| DE | 102016209418 A1 | 11/2017 |
| DE | 102017119968 A1 | 2/2019 |
| DE | 202019104576 U1 | 9/2019 |

* cited by examiner

METHOD FOR MOVING A VEHICLE TO A COMPONENT OF AN OBJECT AT A DISTANCE THEREFROM (COORDINATE TRANSFORMATION)

FIELD OF THE INVENTION

The invention relates to a method for moving a vehicle to a component of an object at a distance therefrom, the vehicle having a navigation module which has a camera and an evaluation electronics, comprising the steps of: attaching an identification element to the object in a predetermined position in such a way that it is recognized by the camera in a far range ($D_{max}$) of the vehicle from the object, and calculating a reverse driving line of the vehicle by the evaluation electronics from the perspective position of the camera in relation to the identification element.

BACKGROUND OF THE INVENTION

Methods like this are used to simplify the approach of a vehicle to a stationary object or even to be able to carry it out autonomously, i.e. without the involvement of a driver.

Document DE 10 2017 119 968 A1 discloses a pattern that can be detected on the front of a trailer, wherein the pattern comprises at least one fixed point. A two-dimensional coordinate system located in the front of the semi-trailer is spanned with the help of the fixed point and possibly other points that are arranged at a predefined distance from the fixed point and recorded by a detection unit, which is designed in particular as a camera system. A major disadvantage of a trailer designed in this way is the ability to find the coupling means, since the distance between the kingpin in the longitudinal direction of the vehicle and the front of the trailer is not known during coupling and incorrect couplings can occur, especially when the vehicle approaches at an angle.

Another prior art is described by document DE 10 2014 217 746 A1 having a vehicle and an implement to be picked up by the vehicle. A folding sign with a checkerboard pattern is present on the implement, which is recognized by at least one camera. The approach angle is calculated from the distortion of the checkerboard pattern, with the exact height of a coupling device on the implement being unknown. Furthermore, a perception engine does not process the entire image from the camera(s), but only a region of interest, so that only a small portion of the camera image is used. This requires a largely precise pre-positioning of the vehicle, for which the driver's participation is necessary.

Document DE 20 2019 104 576 U1 describes a device for positioning two vehicles for a coupling process. A sign is attached to one of the vehicles with a QR code applied thereto, which also contains position data regarding the associated coupling means relative to the sign. The sign is recognized and read by a camera located on the other vehicle. Finally, the other vehicle is moved from a starting position to a hitching position based on a calculated path. However, the known device has proven to be unsuitable for equipping commercial vehicles, since the sign would have to be attached to the front of the trailer, especially in the case of a semi-trailer, and the sign would run over the camera during coupling, so that it would no longer be available for navigation.

Document DE 10 2016 209 418 A1 explains a method and a system for operating a combination of towing vehicle and trailer, in which the position of the trailer relative to the towing vehicle is to be improved both before coupling and in the coupled state. For this purpose, the trailer has at least one information carrier that can be read out by a readout device on the towing vehicle. Based on the measured position of the information carrier, the relative position of the trailer to the towing vehicle is determined, which also corresponds to the relative position of the information carrier.

Document DE 10 2012 003 992 A1 deals with a route guidance system for motor vehicles with a camera arranged at the rear of the vehicle and a position-determining marking attached to a stationary object, as well as an electronic image processing device. Information about the geometry of the marking is stored in the image processing device and is compared with an image provided by the camera. Position information of the vehicle relative to the stationary object is determined from this comparison.

Document DE 10 2004 029 130 A1 deals with a method for coupling a trailer to a motor vehicle. When a motor vehicle approaches the trailer, stored model data of the hitching area of the trailer are used in order to segment them in image data captured by an image sensor, i.e. to locate the structures in the image that correspond to the model data. The stored model data of the coupling area are placed in the correct position in the image data and a target zone for coupling the motor vehicle to the trailer is determined from this superimposition of the model data with the image data.

Proceeding from the disadvantages of the prior art, the object of the invention was to develop a method for improving the approach of a vehicle to a stationary object.

SUMMARY OF THE INVENTION

The object is achieved according to the invention with a method for moving a vehicle to a component of an object at a distance therefrom, the vehicle having a navigation module which has a camera and an evaluation electronics, comprising the steps of: attaching an identification element to the object in a predetermined position in such a way that it is recognized by the camera in a far range ($D_{max}$) of the vehicle from the object, and calculating a reverse driving line of the vehicle by the evaluation electronics from the perspective position of the camera in relation to the identification element, wherein in a start position (S) of the vehicle, the navigation module generates a static object coordinate system ($K_O$) and the reverse driving line is calculated from the start position (S) to a pre-positioning point ($S_{Vi}$, $S_{Vii}$, $S_{Viii}$).

The vehicle can be a towing vehicle, the object can be a trailer vehicle and the component can be a coupling means of the trailer vehicle. Advantageously, the trailer vehicle is a semi-trailer and the coupling means is a king pin. The camera and the evaluation electronics are then arranged in particular on the towing vehicle. The identification element is favorably attached in a stationary manner to a front side of the trailer vehicle, in particular to a front side of the trailer.

Alternatively, the vehicle may include a towing vehicle and a trailer vehicle coupled thereto, the object may be a loading ramp, and the component may be a middle position of an upper edge of the loading ramp. In this variant, the camera is arranged in particular on that side of the trailer vehicle which is remote from the towing vehicle. A second camera is advantageously attached to a rear side of the trailer vehicle, which is aligned on the side of the trailer vehicle opposite the front side.

The system also enables the vehicle to approach an object autonomously or semi-autonomously. A self-sufficient approach is understood to mean a fully automated approach of the vehicle without any interaction of the driver or another person, it also being possible for the method to start automatically. In the case of a semi-autonomous approach, the driver can at least start the process and, if necessary, initiate or take over individual steps.

The identification element is preferably a sign attached to the object in the field of view of the camera, wherein on the sign a three-dimensional position information is applied. The sign is expediently arranged on the object within a mounting radius of a maximum of 1.30 m around the component. This makes it possible to focus the camera's field of view on a comparatively small area on the front side of the trailer vehicle. The identification element contains information on the distance from the identification element to the component in the vehicle longitudinal axis, in the vehicle transverse axis and in the vehicle vertical axis.

In addition, information about the position of the front edge of the trailer in the longitudinal axis of the vehicle can be stored in the identification element if this is not arranged exactly above the front edge of the trailer.

Due to the three-dimensional position information, there is precise knowledge of the distance between the component, in particular a coupling means such as a kingpin, while the vehicle is approaching the object. Starting from the front edge of the trailer, for example, the kingpin can be in different positions in the longitudinal axis of the vehicle, depending on the trailer type. Thus, tank or silo vehicles have a distance from the front edge of the trailer to the king pin of often 600 mm to 700 mm, whereas in conventional trailers the king pin is spaced approximately 1700 mm from the front edge of the trailer. Without knowledge of the kingpin position in the vehicle longitudinal axis relative to the identification element, there is a risk of the vehicle speeding too high during coupling, which can result in considerable damage to the kingpin but also to the towing vehicle coupling.

In addition, there is a risk that without knowing the spatial position of the kingpin, the towing vehicle coupling will be driven too far under the towing vehicle during coupling and if the rear of the towing vehicle is raised late by means of the air suspension, the towing vehicle coupling in the vertical axis of the vehicle will be pressed against the kingpin and damaged. The reverse case of raising the towing vehicle coupling too early is also problematic, since the towing vehicle coupling may only have partially moved under the front edge of the trailer while the rear of the towing vehicle is being raised, which means that a coupling plate in particular is subject to bending stress that was not intended for the design. In addition, when the coupling is only partially below the front edge of the trailer, a particularly large lever arm acts on the towing vehicle coupling and also on the trailer, which is also subject to increased bending stress when the towing vehicle coupling is raised and in the loaded state.

In principle, a point in the vicinity of the object can be understood as a pre-positioning point, such as a lifting point in which the air suspension of the vehicle is raised in order to raise a trailer vehicle, or a target position of the vehicle in which a towing vehicle coupling is closed after the coupling means has been retracted. However, a method is particularly preferred in which the pre-positioning point is a virtual point in front of the object, in which the camera loses the identification element from its field of view as the towing vehicle approaches the object further. In the case of an object in the form of a trailer vehicle, in particular a semi-trailer, the camera is advantageously mounted in the rear area or in the vicinity or on components of the towing vehicle coupling, so that the camera moves under the trailer as the towing vehicle approaches and an identification element being attached to the front of the trailer vehicle can no longer be recognized.

The start position is the position in which the object is detected and the static object coordinate system is set up in the navigation module. Basically, the vehicle is placed in the object coordinate system. The main advantage of this procedure is that a reverse driving line is only calculated once in the static object coordinate system, which means that significantly less computing power is required than with a dynamic vehicle coordinate system, in which the reverse driving line is continuously recalculated in iterative steps.

The vehicle is expediently approached backwards from the start position to the object. In this case, the vehicle changes from forward to reverse in the starting position.

It can also be useful if from the start position on there is a change from a dynamic vehicle coordinate system to the static object coordinate system. There is thus a change from the dynamic vehicle coordinate system to the static object coordinate system, in which there is no iterative calculation between the actual and desired position of the vehicle. The consideration for the further approach thus changes from the vehicle to the object. The dynamic vehicle coordinate system is installed in modern vehicles and usually comprises three axes perpendicular to one another and a yaw rate sensor that measures the rotational alignment of the vehicle around the vertical axis.

Advantageously, a close-range is defined in the direction of the object by a close-range radius and a virtual pre-positioning point is set on the close-range radius. The close-range radius has its origin in a target position that corresponds to the component of the object and can be formed, for example, from the central axis of the king pin of a trailer. The opening angle of the close-range radius is limited by the field of view of the camera. An oblique approach and an oblique coupling of the trailer vehicle that may result therefrom can be configured within limits and should not exceed an angle of +/−25°, preferably +/−15°, starting from the longitudinal axis of the trailer vehicle. Starting from the component of the object, in particular from the king pin, the close-range radius is approximately 3.00 m to 4.00 m, preferably 3.50 m.

A target path is preferably calculated from the virtual pre-positioning point in the direction of the component of the object. The target path is, for example, a trajectory which the vehicle follows without changing the steering lock or steering angle set at the pre-positioning point. An embodiment of the method in which the target path is formed from a linearly extending target straight line is particularly preferred. At the end of the reverse driving line, the towing vehicle therefore drives straight back from the pre-positioning point. As a result, a transition is made from a complicated regulation with monitoring and comparison of the target and actual position to a relatively simpler control, in which the vehicle is driven back in the direction of the component without making any control movements. Driving in the reverse direction can advantageously be queried and set by querying the steering angle via the steering system of the vehicle.

It makes sense to always calculate a number of reverse driving lines, each with different mathematical functions, and the vehicle follows a reverse driving line selected therefrom. The multiple reverse driving lines can be stored as a family of curves of trajectory lines after they have been calculated in the evaluation electronics. The vehicle then selects an ideal reverse driving line and follows it. This results in the advantage that less computing power is required in the evaluation electronics than in the case of iterative models. With iterative models, new reverse driving lines are to be calculated sequentially as the vehicle approaches.

A pre-positioning point is expediently calculated on the close-range radius for each of the several reverse driving lines. The pre-positioning points of the several reverse driving lines are all arranged next to one another on the common close-range radius and are located at different distances from the longitudinal axis of the trailer vehicle.

According to a particularly favorable embodiment, an associated target path in the direction of the component of the object can always be calculated from each pre-positioning point. In this case, target paths of pre-positioning points that are further away from the vehicle longitudinal axis on the close-range radius have a larger angle than target paths of pre-positioning points that are on the close-range radius in or adjacent to the vehicle longitudinal axis.

From the plurality of reverse driving lines, that one is advantageously determined as the selected reverse diving line in which an angle between the target path and the longitudinal axis of the trailer vehicle is as small as possible. Due to the small angle, the towing vehicle is approached and coupled as precisely as possible in the longitudinal axis of the trailer vehicle.

Each of the reverse driving lines can have a tolerance corridor in which an actual driving route of the vehicle is corrected. If the vehicle leaves the tolerance corridor due to a special event such as an incline, black ice or an unstable surface, reverse travel is aborted and the situation is reassessed from a new starting position at this point.

Favorably, when leaving the tolerance corridor and starting from a new starting position, new reverse driving lines are calculated.

The identification element is advantageously read out and verified in the far-range. Within the method to be carried out, the far range of the vehicle is the area that is spatially furthest away from the object. First, the identification element should be found in the far-range. For this purpose, the camera is prepared and adjusted in terms of its resolution and exposure time. Finding the identification element is based on an algorithm, according to which an identification element for a trailer or a loading ramp of a specific type is first searched for.

The object is then preferably identified in the far range by means of information stored on the identification element. This can be done by reading an identity number from the identification element. The identity number or a type ID of the object that supplements the identity number can show what type of object it is, for example a trailer vehicle or a loading ramp. Among other things, the type ID can also be linked to the geometric dimensions of the trailer vehicle, which also include special design cases with an interference contour that must be taken into account when the vehicle approaches.

The method for approaching the vehicle to the object is preferably started within the far-range, and this can be done semi-autonomously by a request from the driver, for example on a display. In a self-sufficient process, the start is initiated by preset programming or a signal transmitted externally, possibly from a control room.

It has proven to be particularly expedient if an approach area is provided between the far-range and the close-range, wherein the approach area is delimited from the far-range by means of an approach area radius and from the close-range by means of the close-range radius, with the reverse driving line being calculated in the far range and/or in the approach area using a mathematical function. At least one ideal reverse driving line is generated in the far-range and/or in the approach area. A mathematical function is understood to mean, in particular, a circular or exponential function. The reverse driving line is typically generated in the evaluation electronics of the navigation module. The navigation module determines a three-dimensional location of the vehicle relative to the component of the object by reading out the identification element within the far-range and/or the approach area.

According to a further advantageous method step, a target area follows the close-range area in the direction of the object, separated by a target area radius, with a lifting point being defined on the target area radius, in which an air suspension of the vehicle is raised. The lifting point is located between the front edge of the trailer and the coupling means of the trailer vehicle. As a result, support jacks arranged on the trailer vehicle are initially relieved. In addition, from the lifting point the trailer plate of the trailer lies on top of the coupling plate, so that due to this contact, the towing vehicle coupling and the king pin of the trailer are necessarily aligned with each other in their intended height position and the risk of incorrect couplings due to a misalignment in the vehicle vertical axis is reduced.

A coupling device of a trailer vehicle, in particular a kingpin, and/or a substitute feature arranged on the object is expediently recognized by the camera in the target area.

Advantageously, the target area ends at a position in which the towing vehicle coupling is closed. From the lifting point to reaching the target area, the towing vehicle coupling slides under the trailer. After the towing vehicle coupling has been closed, the king pin is rotatably held in the towing vehicle coupling, so that the towing vehicle and trailer are mechanically connected to one another.

BRIEF DESCRIPTION OF THE DRAWINGS

For better understanding, the invention is explained in more detail below with reference to 8 Figures, which show in FIG. 1 is a perspective view of a towing vehicle and an object in form of a trailer before coupling.

DETAILED DESCRIPTION OF THE INVENTION

Figure 1:
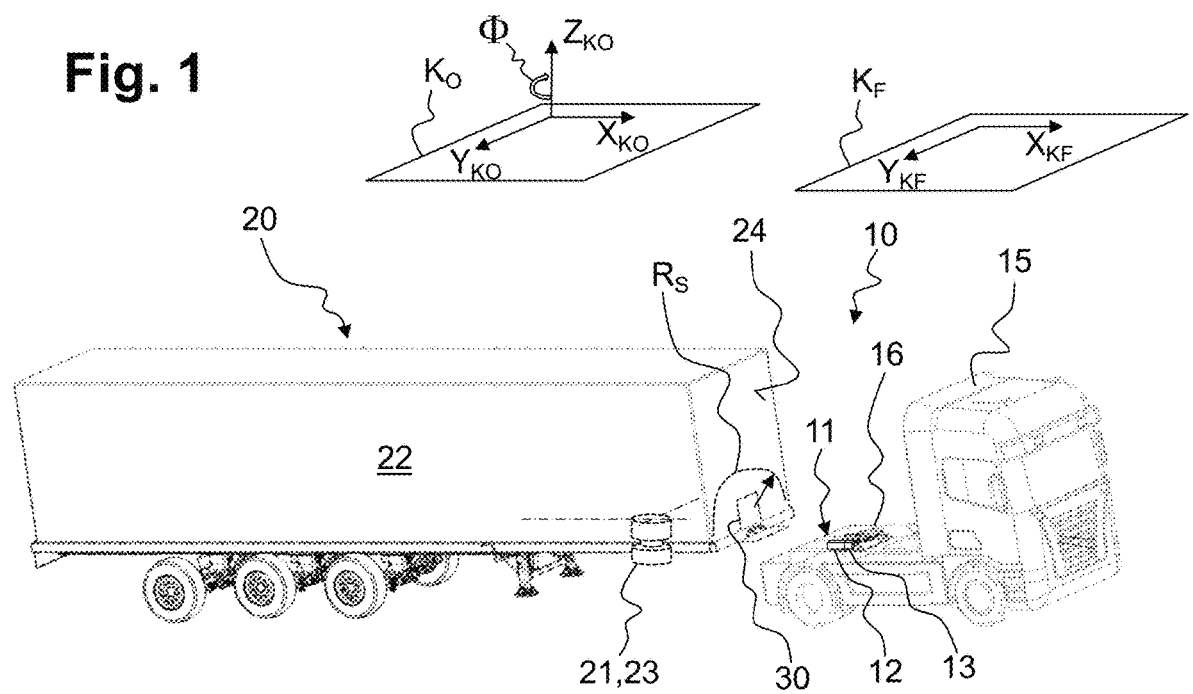

FIG. 1 shows a perspective view of a vehicle 10 in the form of a towing vehicle 15, which is being driven backwards towards a component 21 of an object 20 in the form of a trailer vehicle 22 at a distance from the towing vehicle 15 in order to pick up the trailer vehicle 22 and mechanically couple it to one another.

Figure 5:
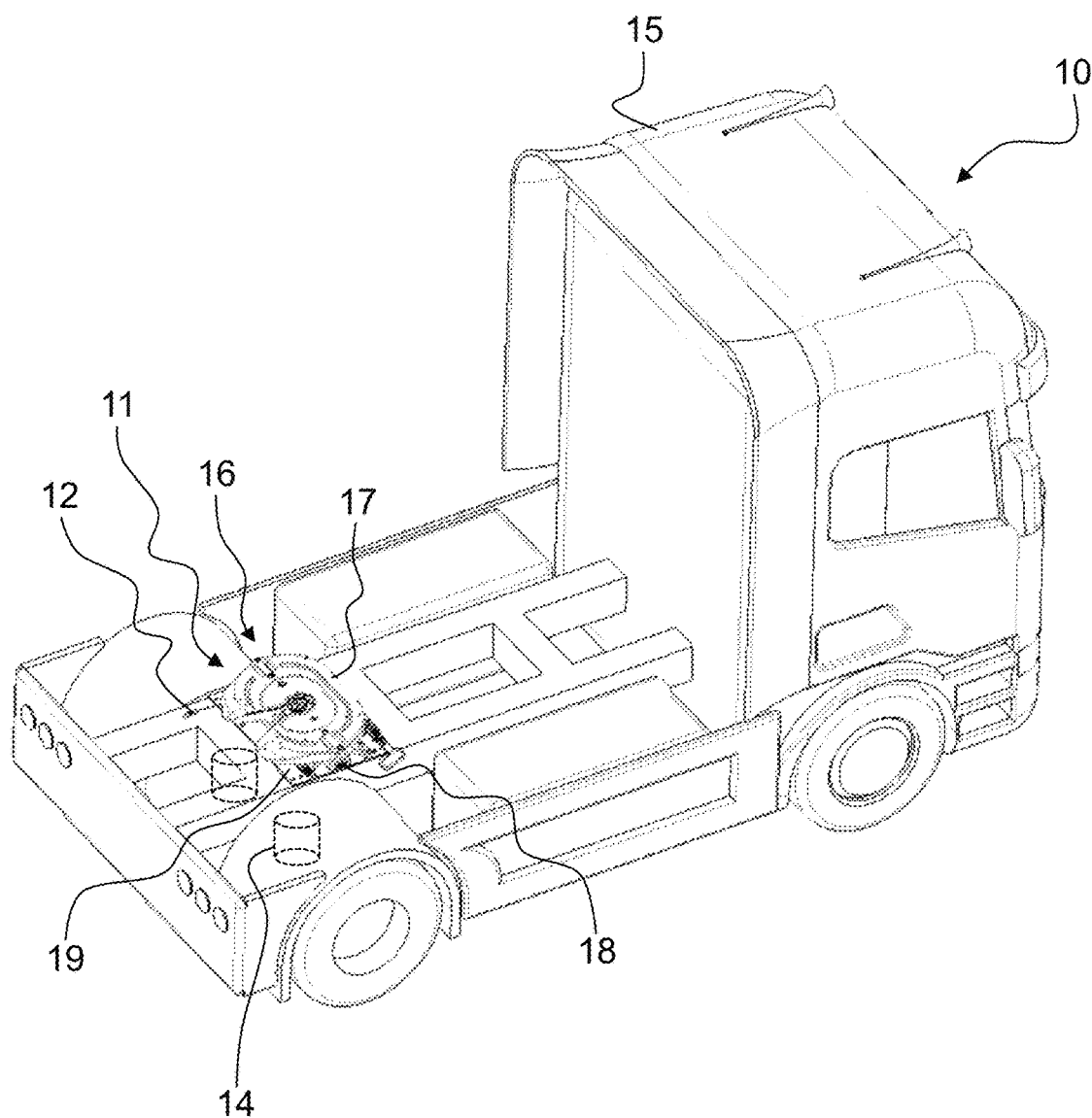
FIG. 5 is a perspective view of a towing vehicle with a navigation module attached to the towing vehicle coupling.

In the coupled state, the towing vehicle 15 and the trailer vehicle 22 form an articulated tractor-trailer assembly. For a detachable connection to the trailer vehicle 22, the towing vehicle 15 has a towing vehicle coupling 16, into which a coupling means 23 of the trailer vehicle 22 can be inserted and locked. The towing vehicle coupling 16 can be seen particularly well in FIG. 5 and comprises a coupling plate 17 which is fastened to the towing vehicle 15 by means of two bearing blocks 18 mounted laterally thereon. The bearing blocks 18 stand on a mounting plate 19, which in turn rests on two beams of a vehicle frame not further identified and being permanently connected to them.

The coupling means 23 of the trailer vehicle 22 is usually a king pin that projects downwards forming the component 21 of the object 20 and is shown enlarged in FIG. 1 for a better understanding. For a smooth and damage-free coupling, the towing vehicle 15 must be reversed as precisely as possible towards the stationary trailer vehicle 22.

For an autonomous or semi-autonomous approach of the towing vehicle 15 to the trailer vehicle 22, the towing vehicle 15 has a navigation module 11 which includes at least one camera 12 and evaluation electronics 13. It is preferred to attach the navigation module 11 to components of the towing vehicle coupling 16, in particular to the coupling plate 17, one of the bearing blocks 18 and/or the mounting plate 19.

The vehicle 10 permanently generates a dynamic vehicle coordinate system $K_F$, which is spanned at least from a longitudinal axis $X_{KF}$ of the vehicle 10 and a transverse axis $Y_{KF}$. In addition, an object coordinate system $K_O$ is generated in the navigation module 11 of the vehicle 10, which can be spanned in particular from a longitudinal axis $X_{KO}$ of the object 20 such as the trailer vehicle 22, a transverse axis $Y_{KO}$ and a vertical axis $Z_{KO}$. In addition, it is expedient for a particularly accurate coupling process to know a yaw angle $\Phi$ of the object 20, for example of the trailer vehicle 22.

In any case, a detectable field of view of the camera 12 is directed backwards in the longitudinal axis $X_{KF}$ of the vehicle 10 in the direction of the object 20.

An identification element in the form of a sign 30 is fixed in place on the object 20 and is located on a front side 24 of the trailer vehicle 22 in FIG. 1. The sign 30 can, but does not have to, be aligned centrally in a vehicle longitudinal axis x of the trailer vehicle 22. However, it is preferable to attach the sign 30 in a mounting radius $R_S$ around the vehicle longitudinal axis x corresponding to half the width $T_B$ (see FIG. 7) of the trailer vehicle 22 so that the camera 12 can accurately find and read it.

Figure 2:
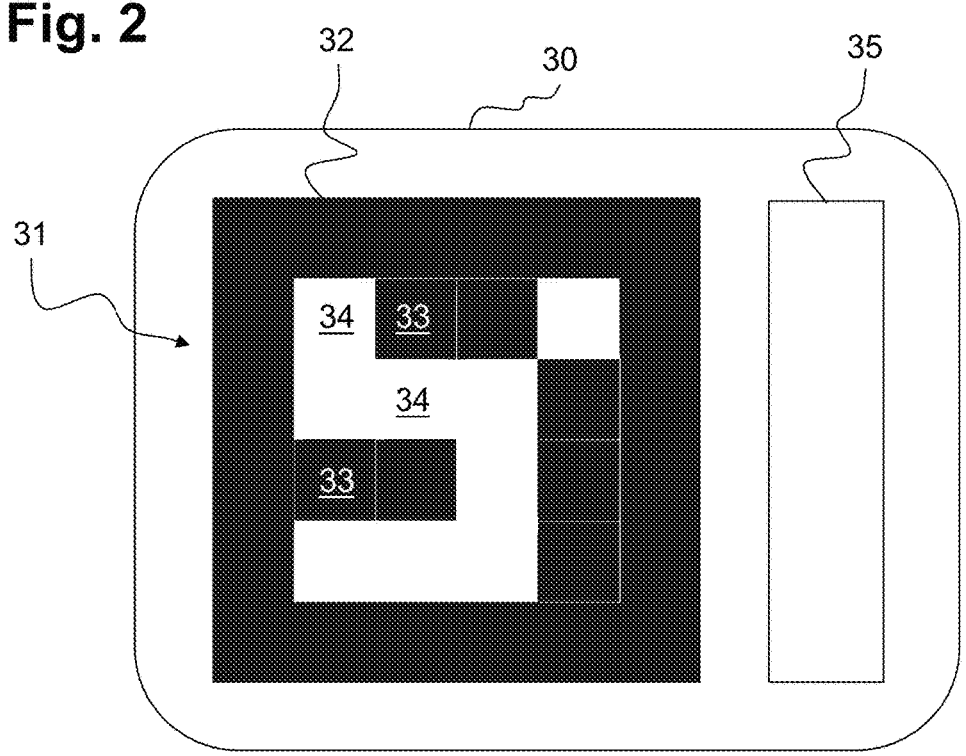
FIG. 2 is a plan view of an identification element in the form of a sign with markers.
Figure 6:
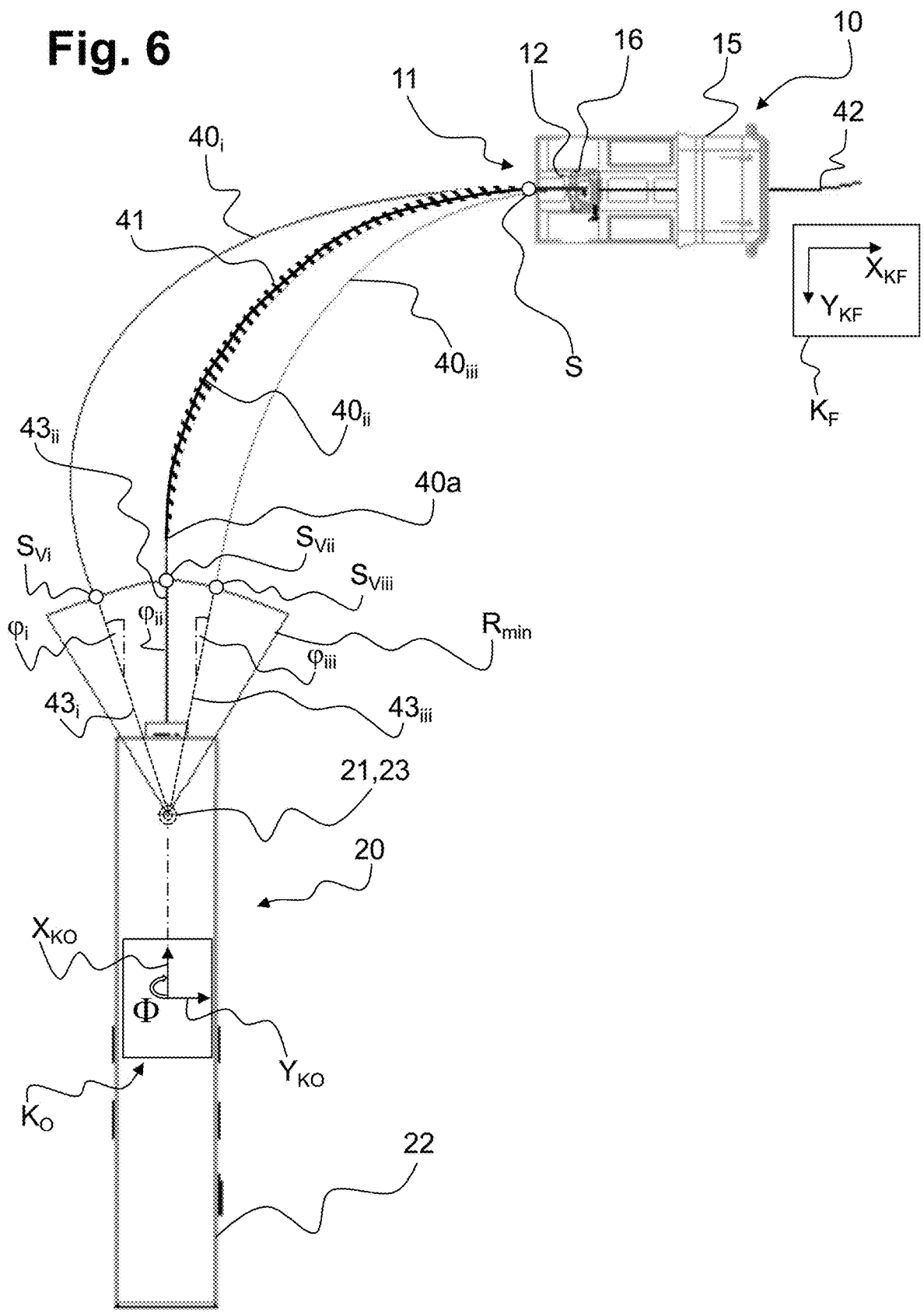
FIG. 6 is a plan view of a towing vehicle with three reverse driving lines to a semi-trailer.

The sign 30 has a number of markers 31, which can be seen in FIG. 2 by way of example. Each marker 31 is designed as a square field with a high-contrast, dark filling on the surface of the sign 30. Markers 31 are used to calculate in the evaluation electronics 13 on the towing vehicle 15 at least one reverse driving line $40_i$, $40_{ii}$, $40_{iii}$, as shown in FIG. 6 based on a perspective change in the relative position of the camera 12 and the sign 30. The further the camera 12 migrates laterally to the sign 30 as the vehicle 10 approaches, the greater the distortion of the markers 31. The position of the vehicle 10 relative to the sign 30 is calculated from the distortion of the markers 31. The sign 30 is always searched for in the entire field of view of the camera 12.

The corners of an outer marker 32, which forms a closed outer border, are used in particular for an accurate calculation of the reverse driving line $40_i$, $40_{ii}$, $40_{iii}$. Additional inner markers 33 enable the navigation module 11 to recognize whether the vehicle 10 is approaching the object 20 from the front or rear, since there are no markers 31, in particular no inner markers 33, on the back of a sign 30 that is sometimes free-standing. The inner markers 33 are arranged offset to an outer contour of the outer marker 32 inwards by the amount of their size. Individual inner markers 33 border on free spaces 34 which have the same size as the inner markers 33. In principle, all markers 31 are applied to a single sign 30.

In addition, a three-dimensional position information of the component 21, in the embodiment of FIG. 1 of the king pin 23, relative to the sign 30 is stored in the markers 31, in particular in the inner markers 33. A three-dimensional position information is understood to mean the distance of sign 30 from component 21, for example king pin 23, in the longitudinal axis $X_{KO}$ of the object 20, in a transverse axis $Y_{KO}$, and in a vertical axis $Z_{KO}$.

The navigation module 11 reads the three-dimensional position information and mathematically modifies the coordinates of the mounting position of the sign 30 according to an offset, so that the vehicle 10 hits the component 21 of the object 20 instead of the sign 30. It is essential that the sign 30 is always fixed in place on the object 20 according to the three-dimensional position information about the component 21 stored thereon and does not change its own position.

The markers 31, in particular the inner markers 33, also contain information about the identity of the object 20, which is also read out by the navigation module 11. In this way, for example, the vehicle 10 receives information as to what type of trailer vehicle 22 the trailer vehicle 22 to be coupled is. The type of trailer vehicle 22 is understood to mean, for example, whether it is a refrigerated, silo or tank trailer. Such trailer vehicles 22 often have an interfering contour that must be taken into account when the vehicle 10 approaches. The information contained in markers 31 relates, among other things, to geometric or technical data on the nature of object 20, which is taken into account when calculating reverse driving lines $40_i$, $40_{ii}$, $40_{iii}$ (see FIG. 6, FIG. 7) in order to enable an accident-free approach.

In addition to the markers 31, the sign 30 also has a coding field 35 in which, in particular, a QR code is applied. Provision can also be made for an identification number of the trailer vehicle 22 to be implemented in the sign 30 which is read out by the camera 12, expediently in the coding field 35 or alternatively also in the markers 31, in particular the inside markers 33. Logistic information relating to the object 20 or trailer vehicle 22 can be linked to the sign 30 via the identification number, so that the object 20 or trailer vehicle 22 is identified as the one being sought when the towing vehicle 15 approaches. In principle, the coding field 35 contains information that is primarily important for the logistical and less important for the navigational evaluation.

A lifting point $S_A$ for the towing vehicle 15 can also be defined in the markers 31, in particular the inner markers 33, or with the help of an identification number of the trailer vehicle 22 implemented on the coding field 35, wherein at the lifting point $S_A$ an air suspension 14 (see FIG. 5) of the towing vehicle 15 is raised at least until the coupling plate 17 comes into contact with the semi-trailer 22.

Figure 3:
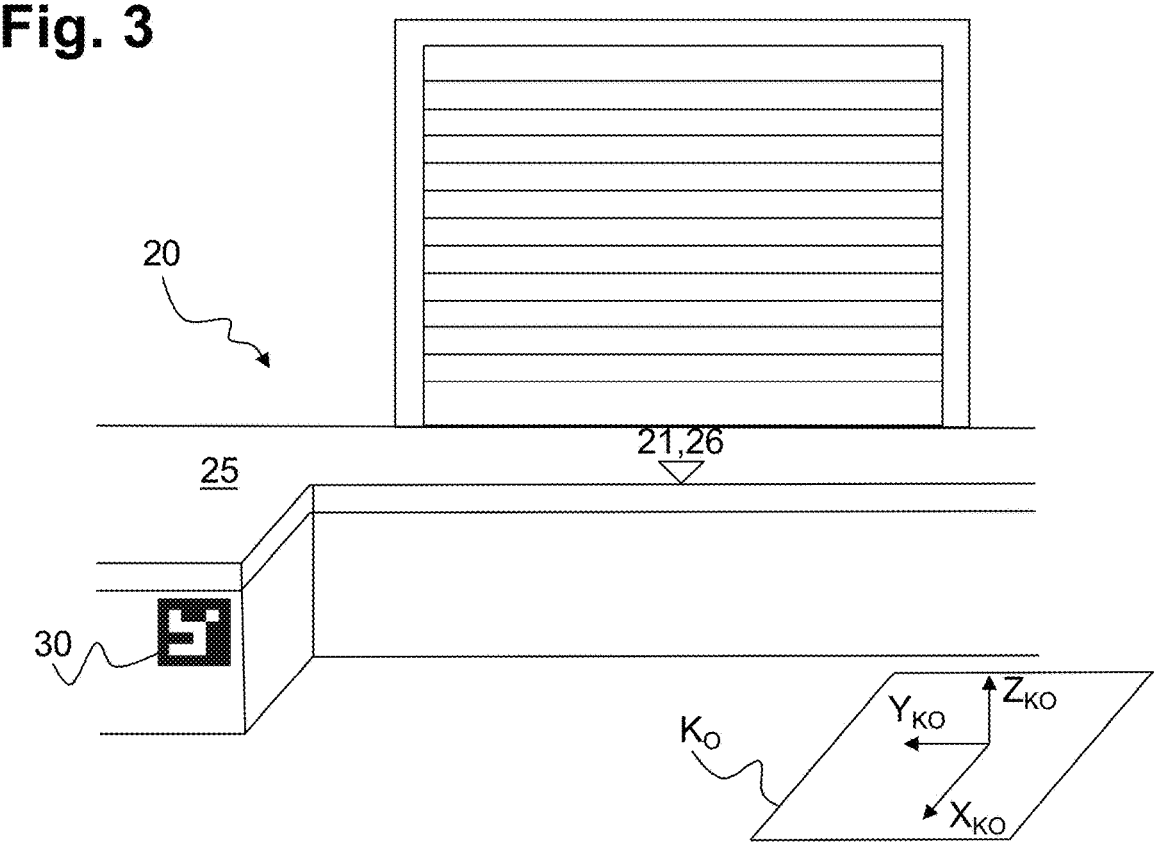
FIG. 3 is a perspective view of an object in form of a loading ramp.
Figure 4:
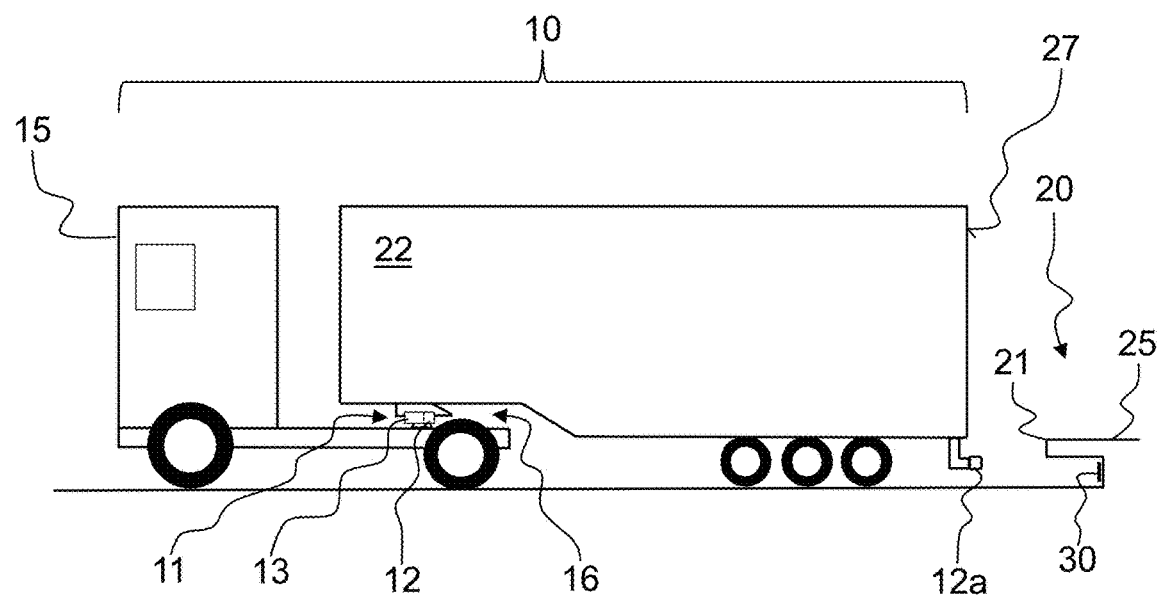
FIG. 4 is a side view of a vehicle comprising a towing vehicle and a semi-trailer coupled thereto when approaching a loading ramp.

FIG. 3 shows an alternative exemplary embodiment of the invention, in which the object 20 is a loading ramp 25, the middle position of an upper edge 26 of which represents the component 21 to navigate to. At a predetermined position of the loading ramp 25 a sign 30 is fixed in place, in which the three-dimensional position information of the middle position upper edge 26 of the loading ramp 25 relative to the sign 30 is stored. A vehicle 10 consisting, for example, of a towing vehicle 15 and a semi-trailer 22 coupled to it, as shown in FIG. 4, moves in the direction of sign 30, corrected by the three-dimensional position information of the middle position upper edge 26 of loading ramp 25, and hits the component 21 to be controlled backwards in the middle.

In this exemplary embodiment, the camera 12 of the navigation module 11 or an additional camera 12a connected to the navigation module 11 should be arranged on a rear side 27 of the trailer vehicle 22 in order to ensure a clear field of view of the sign 30.

FIG. 6 shows the approach of a vehicle 10 in the form of a towing vehicle 15 to a parked trailer vehicle 22 in a plan view. The towing vehicle 15 is in the starting position S. The sign 30 of the trailer vehicle 22 has already been captured by the camera 12 of the navigation module 11 arranged on the towing vehicle 15, read out and a total of three reverse driving lines $40_i$, $40_{ii}$, $40_{iii}$ have been calculated on the basis of different mathematical functions.

For reasons of clarification, only the middle reverse driving line $40_{ii}$ of the three reverse driving lines $40_i$, $40_{ii}$, $40_{iii}$, which has already been identified as the selected reverse driving line 40a by the navigation module 11, is provided with a tolerance corridor 41. A tolerance corridor 41 is understood as kinematic envelope around one or more reverse driving lines $40_i$, $40_{ii}$, $40_{iii}$, within which the towing vehicle 15 can still countersteer in the event of deviations from the selected reverse driving line 40a in order to return to the originally selected reverse driving line 40a. If it is determined in the navigation module 11 that a current position of the towing vehicle 15 is outside of the tolerance corridor 41, steering back is no longer possible. Instead, the current position is interpreted as the new starting position S, from which a new set of curves of reverse driving lines $40_i$, $40_{ii}$, $40_{iii}$ is calculated again in the navigation module 11. The newly calculated reverse driving lines $40_i$, $40_{ii}$, $40_{iii}$ are preferably also each provided with a tolerance corridor 41.

In all of the exemplary embodiments, the reverse driving line(s) $40_i$, $40_{ii}$, $40_{iii}$ calculated by the navigation module 11 always ends in an associated pre-positioning point $S_{Vi}$, $S_{Vii}$, $S_{Viii}$ in front of the trailer vehicle 22. When one of the pre-positioning points $S_{Vi}$, $S_{Vii}$, $S_{Viii}$ is reached, the towing vehicle 15 exclusively drives straight backwards. The reverse driving lines $40_i$, $40_{ii}$, $40_{iii}$ are therefore no longer continuously calculated after the pre-positioning point $S_{Vi}$, $S_{Vii}$, $S_{Vii}$ has been passed. Each of the pre-positioning points $S_{Vi}$, $S_{Vii}$, $S_{Viii}$ lies on a close-range radius $R_{min}$, whose distance from the object 20 is predetermined by the field of view of the camera 12, 12a. As the towing vehicle 15 approaches a camera 12 arranged in the vicinity of the towing vehicle coupling 16 moves under the front side 24 of the trailer vehicle 22 with the sign 30 attached to it, so that from the pre-positioning point $S_{Vi}$, $S_{Vii}$, $S_{Viii}$, the sign 30 is no longer located in the field of vision of the camera 12. From the pre-positioning point $S_{Vi}$, $S_{Vii}$, $S_{Viii}$ onwards, the towing vehicle 15 is no longer in a controlled approach along a selected reverse driving line 40a, but in a controlled straight-ahead travel on one of the associated target paths $43_i$, $43_{ii}$, $43_{iii}$ in a linear direction the component 21 of the object 20.

The reverse driving line $40i$ running on the left in the image plane of FIG. 6 ends on the close-range radius $R_{min}$ in the associated pre-positioning point $S_{Vi}$. The straight target path $43i$ running from here in the direction of the coupling means 23 spans an angle $\varphi_i$ with respect to the vehicle longitudinal axis x of the trailer vehicle 22. The reverse driving line $40_{iii}$ running on the right in the image plane also ends on the close-range radius $R_{min}$ in the pro-positioning point $S_{Viii}$. The straight target path $43_{iii}$ running from the pre-positioning point $S_{Viii}$ in the direction of the coupling means 23 spans an angle $\varphi_{iii}$ to the vehicle longitudinal axis x of the trailer vehicle 22.

The middle reverse driving line $40_{ii}$ ends on the close-range radius $R_{min}$ in the pre-positioning point $S_{Vii}$ in the middle in front of the trailer vehicle 22. The straight target path $43_{ii}$ runs from the pre-positioning point $S_{Vii}$ to the coupling means 23 and is ideally aligned with the vehicle longitudinal axis x of the trailer vehicle 22. The angle $\varphi_{ii}$ is in this case 0°.

From the calculated reverse driving lines $40_i$, $40_{ii}$, $40_{iii}$, the navigation module 11 identifies as the selected reverse driving line 40a this one which has an angle $\varphi_i$, $\varphi_{ii}$, $\varphi_{iii}$ with the lowest value.

Figure 7:
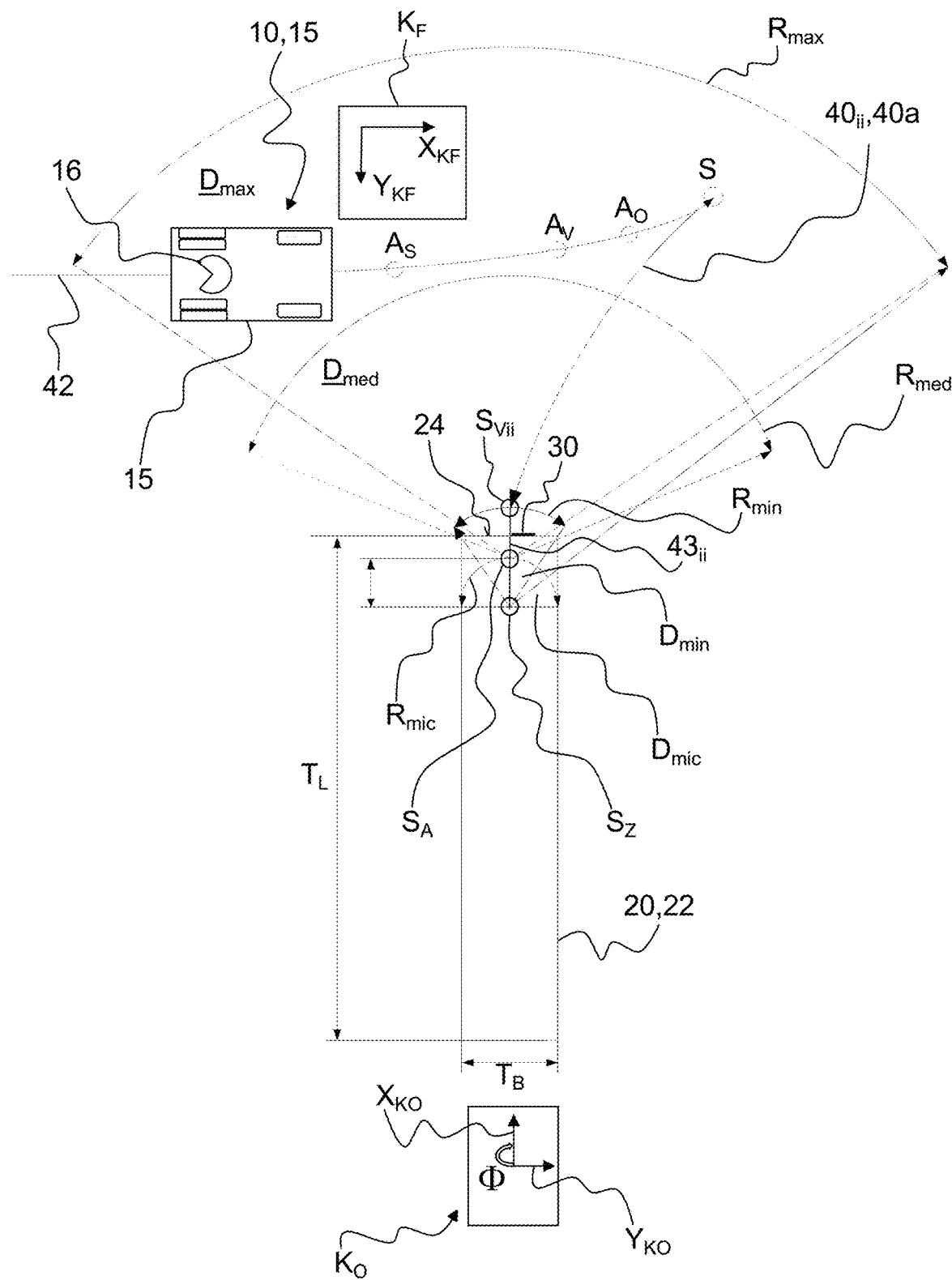
FIG. 7 is a plan view of a towing vehicle with a reverse driving line running through different areas to a semi-trailer.
Figure 8:
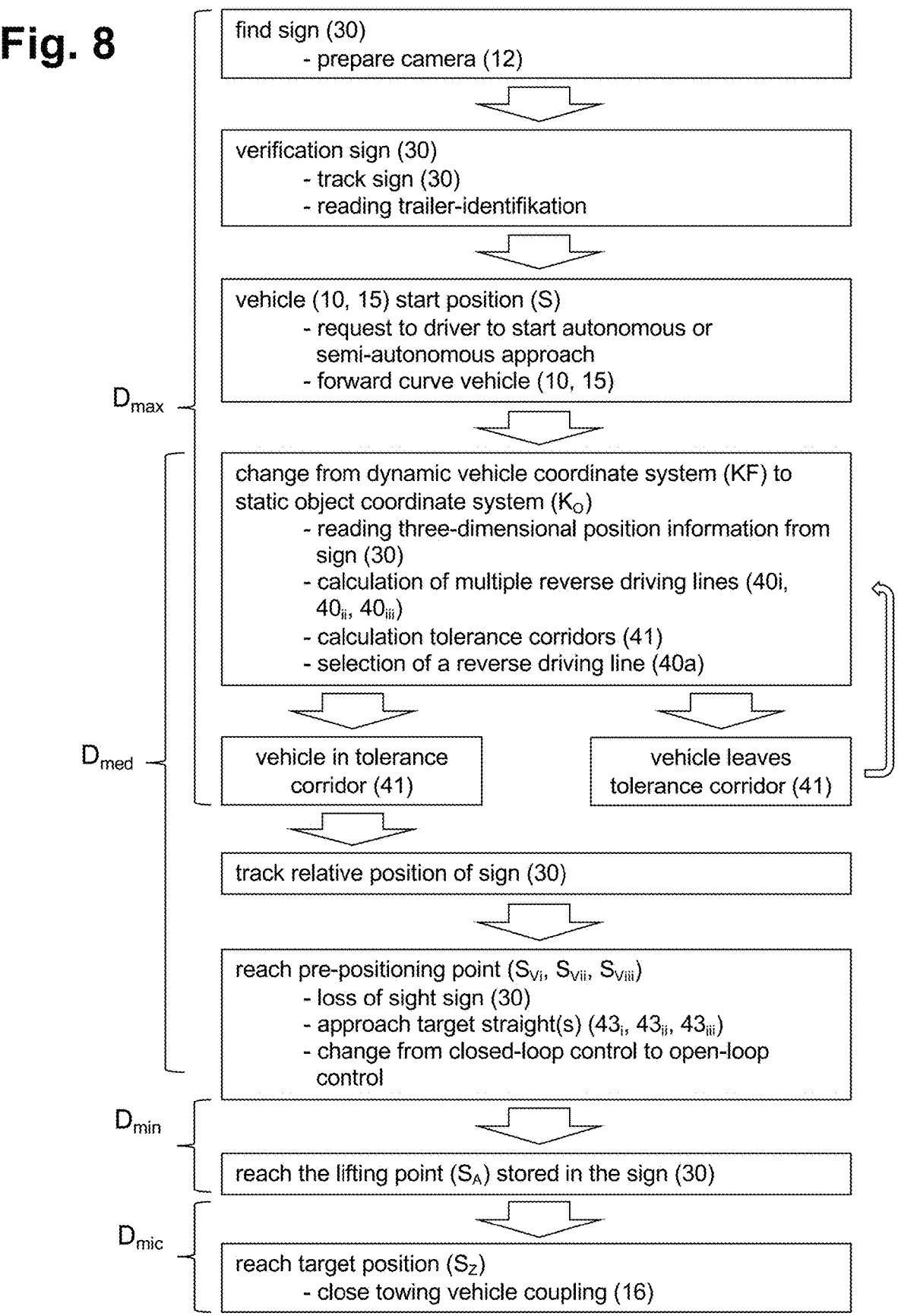
FIG. 8 is a flowchart of method steps according to the invention.

Typically, a vehicle 10 is moved in the direction of an object 20 on a route 42 running through four different areas, which is shown graphically in FIG. 7 and explained as a flow chart in FIG. 8. To simplify the representation, only one of several possible reverse driving lines $40_i$, $40_{ii}$, $40_{iii}$, is shown in FIG. 7, namely the reverse driving line $40_{ii}$ already identified as favorable in FIG. 6.

In a far-range $D_{max}$, the vehicle 10 driving in the forward direction, for example a towing vehicle 15, approaches a semi-trailer 22 to be coupled. The semi-trailer 22 has a predetermined length $T_L$ and width $T_B$.

The far-range $D_{max}$ is delimited outwards in the radial direction towards the object 20 by a far-range radius $R_{max}$ and in the direction of the object 20 by an approach area radius $R_{med}$. Outside the far-range radius $R_{max}$, the vehicle 10 moves in its usual driving environment without relevance for a method and a system for approaching the vehicle 10 to a stationary object 20. The far-range radius $R_{max}$ has, starting from the lifting point $S_A$, a length of 12.00 m to 17.00 m, preferably 13.00 m to 16.00 m, very preferably 14.00 m to 15.00 m, and covers an angle of 100° to 120° in the straight forward direction of the object 20.

Within the far-range $D_{max}$, the method or system for moving a vehicle 10 to an object 20 is triggered when the approach point system start $A_S$ is reached. The system start can be triggered manually by the driver, by means of a remote control from a control station, or by predetermined programming.

While the vehicle 10 is still driving forward, it reaches an approach point for establishing a link connection $A_V$, from which point the camera 12 is switched on and a sign 30 on an object 20 is searched for. If the link connection at the approach point $A_V$ is successful, an identification number of the object 20, in particular of the trailer vehicle 22, is subsequently read out in an object information approach point $A_O$. Consequently, the navigation module 11 knows the type of trailer vehicle 22 and sometimes also its geometric dimensions. The forward travel of the vehicle 10 on the route 42 ends in the starting position S. The speed of the vehicle 10 is less than 50 km/h in the far-range $D_{max}$.

Starting from the start position S located in the far-range $D_{max}$, at least one reverse driving line $40_i$, $40_{ii}$, $40_{iii}$ is generated by means of the navigation module 11, wherein the respective line is identified in FIG. 7 as the selected reverse driving line 40a. The reverse driving line $40_{ii}$ is calculated based on the perspective alignment of the camera 12 to the markers 31 applied to the sign 30 and corrected by the three-dimensional position information of the component 21 of the object 20, the position information also being stored in the markers 31 of the sign 30. If necessary, the navigation module 11 also determines an associated tolerance corridor 41 for one or more reverse driving lines $40_i$, $40_{ii}$, $40_{iii}$.

After passing the approach area radius $R_{med}$, the vehicle 10 has changed to the approach area $D_{med}$. Starting from the lifting point $S_A$, the approach area radius $R_{med}$ has a length of 6.00 m to 10.00 m, preferably 7.00 m to 9.00 m, and covers an angle of 130° to 140° in the straight forward direction of the object 20. While driving through the approach area $D_{med}$, the already generated reverse driving line $40ii$, $40a$ is traveled along and the three-dimensional position information is read from the sign 30 and the position of the sign 30 relative to the camera 12 is tracked. The speed of the vehicle 10 is reduced in the approach area $D_{med}$ with respect to the far-range $D_{max}$ and can be a maximum of 20 km/h, for example.

The approach area $D_{med}$ transitions into a close-range $D_{min}$ when the close-range radius $R_{min}$ is reached. The close-range radius $R_{min}$ has a length of 3.00 m to 4.00 m, preferably 3.30 m to 3.70 m, starting from a target position $S_Z$ that corresponds to the component 21, and covers an angle up to 140° in the straight forward direction of the object 20. The speed of the vehicle 10 is reduced even further in the close-range $D_{min}$ with respect to the approach area $D_{med}$ and can be a maximum of 5 km/h, for example.

Upon reaching the close-range radius $R_{min}$, the vehicle 10 is located in the pre-positioning point $S_{Vii}$, which is located immediately in front of the component 21 of the object 20 in the forward direction. From the pre-positioning point $S_{Vii}$ onwards, the sign 30 attached to the front side 24 of the object 20 is no longer captured by the field of view of the camera 12 and therefore is no longer usable for capturing the relative position of vehicle 10 to the object 20, since the rear of the towing vehicle 15 has already driven under the trailer vehicle 22. However, the towing vehicle 15 and trailer vehicle 22 are aligned with one another in the vehicle longitudinal axis x, so that the towing vehicle 15 only needs to reverse in order to hit the coupling means 23 of the trailer vehicle 22.

The close-range $D_{min}$ transitions into the target area $D_{mic}$ when a target area radius $R_{mic}$ is reached. Starting from the target position $S_Z$ that matches the component 21, the target area radius $R_{mic}$ has a length corresponding to half of the width of the object 20, in the present example half of the width $T_B$ of the trailer vehicle 22 of 2.55 m, for example, and covers an angle in the straight forward direction of the object 20 of up to 180°. The lifting point $S_A$, at which the rear of the towing vehicle 15 together with the towing vehicle coupling 16 is lifted by the air suspension 14, lies on the target area radius $R_{mic}$ in the longitudinal axis x of the vehicle. From the lifting point $S_A$, the towing vehicle coupling 16 is in sliding contact with the trailer vehicle 22 until it reaches the target position $S_Z$, in which the kingpin 23 has entered the towing vehicle coupling 16. The speed of the vehicle 10 is reduced even further in the target area $D_{mic}$ with respect to the close-range $D_{min}$ and can be a maximum of 2.5 km/h, for example.

LIST OF REFERENCE NUMBERS 10 vehicle
11 navigation module
12 camera
12a additional camera trailer vehicle
13 evaluation electronics
14 air suspension
15 towing vehicle
16 towing vehicle coupling
17 coupling plate
18 bearing block
19 mounting plate
20 object
21 component
22 trailer vehicle, semi-trailer
23 coupling means, king pin
24 front side trailer vehicle
25 loading ramp
26 middle position upper edge loading ramp
27 rear of trailer vehicle
30 identification element/sign
31 markers
32 outer markers
33 inner markers
34 free space
35 coding field
$40_{i-iii}$ reverse driving lines
$40a$ selected reverse driving line
41 tolerance corridor
42 route vehicle
$43_{i-iii}$ target path/target straight(s)
$A_O$ approach point object information
$A_S$ approach point system start
$A_V$ approach point link connection
$D_{max}$ far-range
$D_{med}$ approach area
$D_{min}$ close-range
$D_{mic}$ target area
$R_{max}$ far-range radius
$R_{med}$ approach area radius
$R_{min}$ close-range radius
$R_{mic}$ target area radius
$R_S$ mounting radius sign
S start position
$S_{Vi\text{-}Viii}$ pre-positioning points
$S_A$ lifting point
$S_Z$ target position
$T_B$ width trailer vehicle/semi-trailer
$T_L$ length trailer/semi-trailer
$K_F$ vehicle coordinate system
$X_{KF}$ vehicle longitudinal axis
$Y_{KF}$ vehicle transverse axis
$K_O$ object coordinate system
$X_{KO}$ object longitudinal axis
$Y_{KO}$ object transverse axis
$Z_{KO}$ object vertical axis
Φ object yaw angle
$\varphi_{i\text{-}iii}$ angle of target path or line/vehicle longitudinal axis

What is claimed is:

1. A method for moving a vehicle to a component of an object at a distance therefrom, the vehicle having a navigation module which has a camera and an evaluation electronics, comprising the steps of:

attaching an identification element to the object in a predetermined position in such a way that it is recognized by the camera in a far range ($D_{max}$) of the vehicle from the object, and calculating a reverse driving line of the vehicle by the evaluation electronics from the perspective position of the camera in relation to the identification element, wherein in a start position (S) of the vehicle, the navigation module generates a static object coordinate system ($K_O$) and the reverse driving line is calculated from the start position (S) to a pre-positioning point ($S_{Vi}$, $S_{Vii}$, $S_{Viii}$).

2. The method according to claim 1, wherein the vehicle approaches the object backwards from the start position (S).

3. The method according to claim 1, wherein from the start position (S) there is a change from a dynamic vehicle coordinate system ($K_F$) to the static object coordinate system ($K_O$).

4. The method according to claim 1, wherein a close-range ($D_{min}$) is defined in the direction of the object by a close-range radius ($R_{min}$) and a virtual pre-positioning point ($S_{Vi}$, $S_{Vii}$, $S_{Viii}$) is set on the close-range radius ($R_{min}$).

5. The method according to claim 4, wherein a target path is calculated from the pre-positioning point ($S_{Vi}$, $S_{Vii}$, $S_{Viii}$) in the direction of the component of the object.

6. The method according to one of claim 5, wherein several reverse driving lines ($40_i$, $40_{ii}$, $40_{iii}$) are always calculated with different mathematical functions and the vehicle follows one selected reverse driving line.

7. The method according to claim 6, wherein a respective pre-positioning point ($S_{Vi}$, $S_{Vii}$, $S_{Viii}$) is calculated on the close-range radius ($R_{min}$) for each of the plurality of reverse driving lines.

8. The method according to claim 7, wherein from each pre-positioning point ($S_{Vi}$, $S_{Vii}$, $S_{Viii}$) always an associated target path is calculated in the direction of the component of the object.

9. The method according to claim 8, wherein from the plurality of reverse driving lines that one is determined as the selected reverse driving line at which an angle ($\varphi_i$, $\varphi_{ii}$, $\varphi_{iii}$) between the target path and the vehicle longitudinal axis (x) of the trailer vehicle is as small as possible.

10. The method according to claim 1, wherein the reverse driving line(s) has/have a tolerance corridor, in which an actual route of the vehicle is corrected.

11. The method according to claim 10, wherein when the tolerance corridor is left, new reverse driving lines are calculated from a new start position (S).

12. The method according to claim 1, wherein the identification element is read and verified in the far-range ($D_{max}$).

13. The method according to claim 1, wherein the object is identified in the far-range ($D_{max}$) by means of information stored on the identification element.

14. The method according to claim 4, wherein an approach area ($D_{med}$) is provided between the far-range ($D_{max}$) and the close-range ($D_{min}$), wherein the approach area ($D_{med}$) is delimited to the far-range ($D_{max}$) by means of an approach area radius ($R_{med}$) and to the close-range ($D_{min}$) by the close-range radius ($R_{min}$), the reverse driving line being calculated in the far-range ($D_{max}$) and/or in the approach area ($D_{med}$) using a mathematical function.

15. The method according to claim 4, wherein the close-range ($D_{min}$) in the direction of the object, separated by a target area radius ($R_{mic}$), follows a target area ($D_{mic}$), wherein on the target area radius ($R_{mic}$) a lifting point ($S_A$) is defined, in which an air suspension of the vehicle is raised.

16. The method according to claim 2, wherein from the start position (S) there is a change from a dynamic vehicle coordinate system ($K_F$) to the static object coordinate system ($K_O$), wherein a close-range ($D_{min}$) is defined in the direction of the object by a close-range radius ($R_{min}$) and a virtual pre-positioning point ($S_{Vi}$, $S_{Vii}$, $S_{Viii}$) is set on the close-range radius ($R_{min}$), and wherein a target path is calculated from the pre-positioning point ($S_{Vi}$, $S_{Vii}$, $S_{Viii}$) in the direction of the component of the object.

17. The method according to claim 16, wherein several reverse driving lines ($40_i$, $40_{ii}$, $40_{iii}$) are always calculated with different mathematical functions and the vehicle follows one selected reverse driving line, wherein a respective pre-positioning point ($S_{Vi}$, $S_{Vii}$, $S_{Viii}$) is calculated on the close-range radius ($R_{min}$) for each of the plurality of reverse driving lines, and wherein from each pre-positioning point ($S_{Vi}$, $S_{Vii}$, $S_{Viii}$) always an associated target path is calculated in the direction of the component of the object.

18. The method according to claim 17, wherein from the plurality of reverse driving lines that one is determined as the selected reverse driving line at which an angle ($\varphi_i$, $\varphi_{ii}$, $\varphi_{iii}$) between the target path and the vehicle longitudinal axis (x) of the trailer vehicle is as small as possible, wherein the reverse driving line(s) has/have a tolerance corridor, in which an actual route of the vehicle is corrected, and wherein when the tolerance corridor is left, new reverse driving lines are calculated from a new start position (S).

19. The method according to claim 18, wherein the identification element is read and verified in the far-range ($D_{max}$), and wherein the object is identified in the far-range ($D_{max}$) by means of information stored on the identification element.

20. The method according to claim 14, wherein the close-range ($D_{min}$) in the direction of the object, separated by a target area radius ($R_{mic}$), follows a target area ($D_{mic}$), wherein on the target area radius ($R_{mic}$) a lifting point ($S_A$) is defined, in which an air suspension of the vehicle is raised.

* * * * *